Feb. 14, 1961  G. PETERSON ET AL  2,971,793
MEANS OF IMPROVING THE TRACTION OF WHEELED VEHICLES
Filed Oct. 24, 1957  2 Sheets-Sheet 1
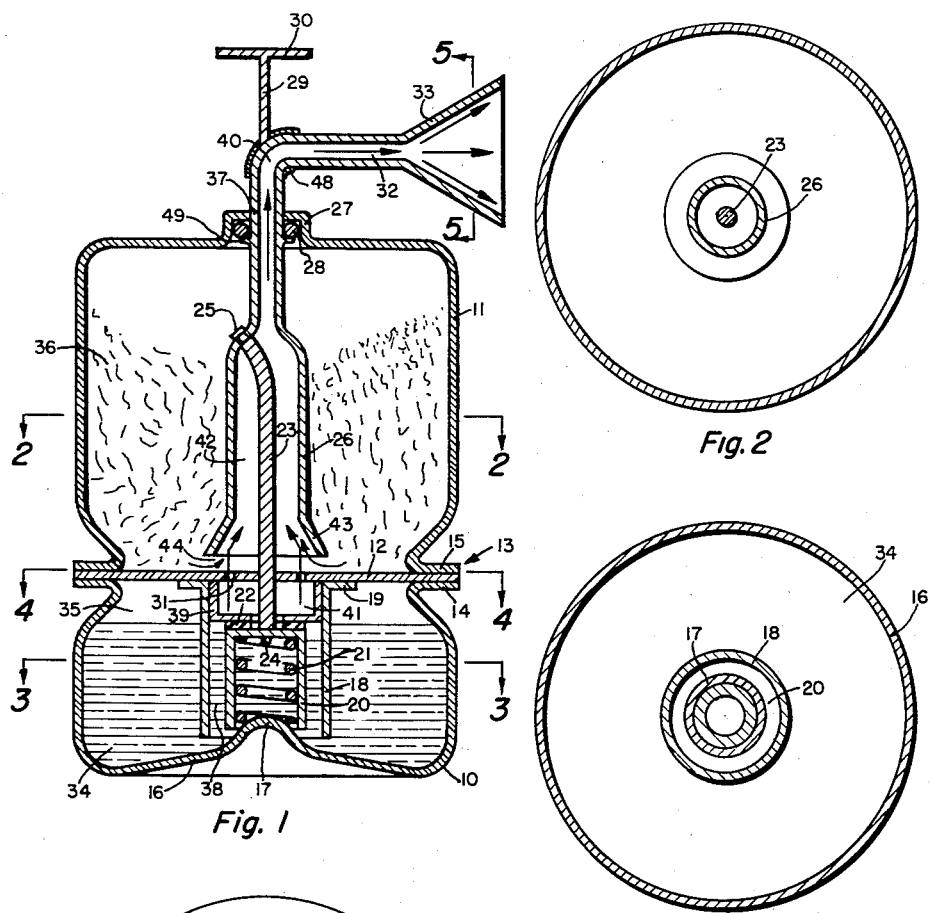
Fig. 1
Fig. 2
Fig. 3
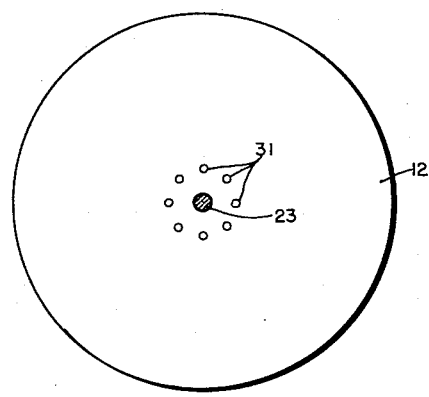
Fig. 4
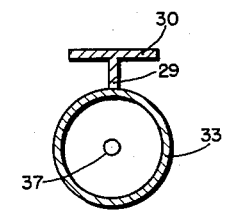
Fig. 5
INVENTORS
Glen Peterson
Dale Peterson Feb. 14, 1961 G. PETERSON ET AL 2,971,793
MEANS OF IMPROVING THE TRACTION OF WHEELED VEHICLES
Filed Oct. 24, 1957 2 Sheets-Sheet 2

INVENTORS
Glen Peterson
Dale Peterson

United States Patent Office 2,971,793
Patented Feb. 14, 1961

2,971,793

MEANS OF IMPROVING THE TRACTION OF WHEELED VEHICLES

Glen Peterson, 540 S. 83rd East Ave., Tulsa, Okla., and Dale Peterson, 2414 St. Marys Drive, Salt Lake City, Utah Filed Oct. 24, 1957, Ser. No. 692,212

5 Claims. (Cl. 291—1)

This invention pertains to traction devices, to methods and means of momentarily improving the traction of wheeled vehicles, and in particular to attachments to automobile tires and the like to provide improved traction on ice, snow, wet and slippery roads.

Metallic chains and special tires, often referred to as snow tires, are now generally used for this purpose. While satisfactory for a great many situations, metallic chains are expensive, somewhat difficult and annoying to put on the tires, especially in cold weather when they are most needed, and they wear out rapidly on a paved road once the snow or ice has melted. At the same time, special types of tires having improved traction in snow or on ice generally require the automobile owner to own two sets of tires: one for winter driving and one for summer driving.

In some areas of the country, owning two sets of tires is not economical; besides, these special tires are generally quite noisy and rough riding once the roads have been cleared and they become unnecessary.

Particularly are chains and special tires objectionable in those areas of the country which ordinarily have mild climates but which occasionally have snow storms and icy streets. In such areas the snow or ice usually lasts a day or two and is gone. In extreme circumstances a man may find himself in desperate need of chains to get to work on a morning after a snow storm but may have absolutely no need for such devices when he returns home at night. The sun may have melted the snow or modern machinery may have been put to good use clearing the streets. To be obliged to apply chains and/or special tires to cars in these circumstances is both awkward and expensive.

The general means of solving this problem is shown in a copending patent application, Serial No. 664,563 dated June 10, 1957 now abandoned. An alternative method and means is disclosed herein.

It is the principal object of this invention to provide inexpensive materials which can readily be attached to automobile tires and which will provide for a reasonable length of time the necessary additional traction on slippery roads. A second object is to provide traction improving materials for automobile tires which are so inexpensive that one can afford to let them wear out with each application. A third object is to provide handy methods and means for quickly applying these traction aiding materials to automobile tires. These and other objects and advantages will become apparent after consideration of the drawings, wherein:

Figure 1 is a drawing in vertical cross-section showing a pressure vessel for containing and applying the traction aiding materials.

Figure 2 is the section across 2—2' of the pressure vessel illustrated in Fig. 1.

Figure 3 is the section across 3—3' of the pressure vessel illustrated in Fig. 1.

Figure 4 is the section across 4—4' of the pressure vessel illustrated in Fig. 1.

Figure 5 is the section across 5—5' of the pressure vessel illustrated in Fig. 1.

Figure 6:
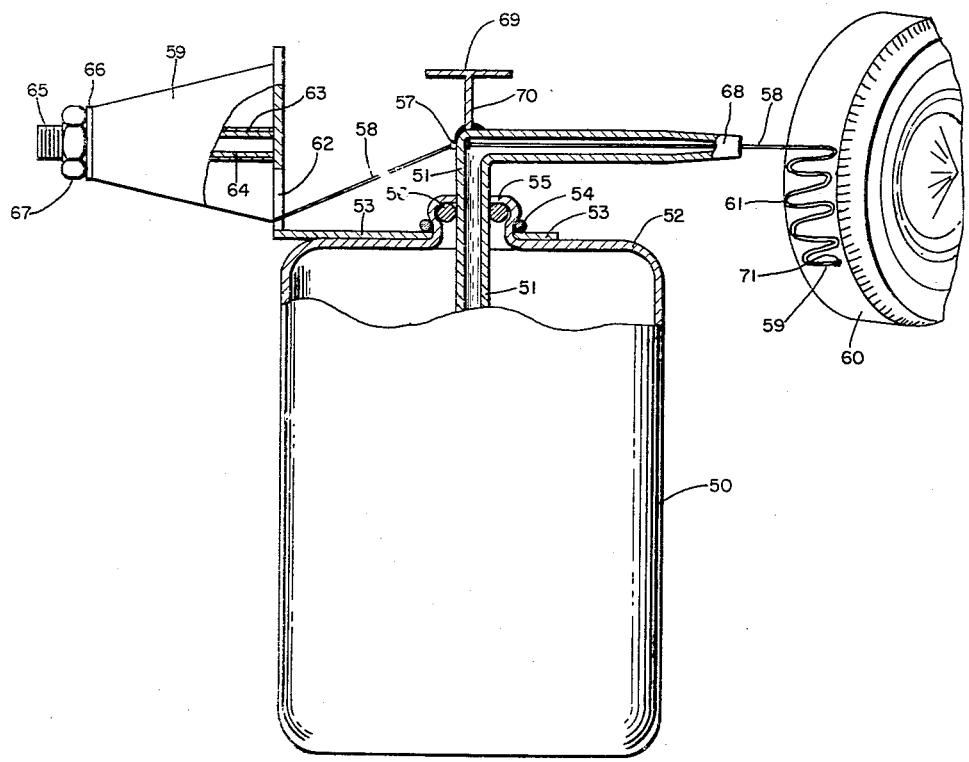
Figure 6 is a drawing in elevation and partial cross-section showing an alternative form of pressure vessel for applying traction aiding materials to automobile tires.

Considering these drawings in detail, 10 is the shell enclosing the lower cavity of the pressure vessel of Fig. 1, and 11 is the shell enclosing the upper cavity of this pressure vessel. The pressure vessel is preferably of the aerosol type which employs an inert liquified gas to produce the required internal pressure, although any material capable of producing this internal pressure may be used providing it is not poisonous or dangerous to people or injurious to automobiles. Such pressure vessels are well-known to commerce and only those details pertinent to the present invention need be described in detail.

The main part of the lower cavity of the pressure vessel 34 generally contains a mixture of Freon and adhesive materials in solution mixture. An upper portion of this lower cavity 35 may, however, contain the pressure producing ingredients in more or less pure form, either in the liquid and/or gaseous states. The upper cavity of the pressure vessel contains a mixture 36 of traction aiding materials such as sand, cotton linters, pulverized pecan or walnut shells, and the like.

The lower shell 10, upper shell 11, and diaphragm 12 are fastened together in an external rim 13, as shown. The lower shell 10 has a formed concave portion terminated by bent-over edge 14, while the upper shell 11 likewise has a formed concave portion terminated by bent-over edge 15. The edges 14 and 15 meet the edge of 12, with the latter between the former two pieces, and all three are fastened together to form a pressure seal, as by heliarc welding, soldering, etc. 10 and 11 thus together form a container for all the materials of the pressure vessel.

Figure 7:
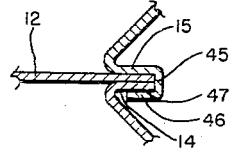
Figure 7 is a fragmentary cross-section showing an alternative method of joining some of the pieces of Fig. 1 together.

An alternative and more economical form of joint is shown in Fig. 7. With this type of joint the edge of the upper or lower cavity shells, in this instance, the edge of the upper cavity shell 15 extends beyond 12 and 14 to form the portions 45 and 46 and by means of suitable tools is tightly crimped around 12 and 14 and one or more gaskets 47. Tools for making this type of joint and seal are well-known to commerce. Such joints have considerable strength and are excellent pressure seals as well.

Again referring to Fig. 1, 18 is a cylindrical piece having a flared upper edge 19 which is spot-welded, or otherwise fastened to 12, in a central location. It extends almost to the bottom of the container, and serves to channel the adhesive mixture into the cylindrical corridor 38 formed by 18 and the cylindrical extension 20 of valve stem 23. A valve seat 39 is spotwelded or otherwise fastened to 18, and a gasket 22 is secured to the bottom edge of 20 and held in place by the valve stem 23. Thus, when the valve stem extension 20 and gasket 22 are held tightly against valve seat 39 by means of spring 21, access of the adhesive mixture to cavity 41 and hence to ports 31 is prevented. But when valve stem 23 is held down by pushing against finger piece 30 so as to lower canal piece 26 to which valve stem 23 is fastened, an opening is provided around gasket 22 and between valve seat 39. The adhesive mixture due to the internal pressure produced by the evaporating liquified gas is then forced into chamber 41, through the ports 31 and into canal 42, as shown by the arrows.

Canal piece 26 serves to contain the flow of adhesive and other materials and direct them into the gooseneck 40 and nozzle 32. The generally cylindrical canal piece has a flared portion 43 in the vicinity of diaphragm 12 and also serves to prevent the mixture of sand and cotton linters, etc., from compacting over the ports 31. The flared portion 43 stops short of diaphragm 12 leaving a controlled passageway 44 for the mixture of sand and cotton linters to fall about ports 31. Thus, as the adhesive mixture 34 is driven in a stream under pressure through ports 31, the stream of adhesive picks up the sand, cotton linters, etc., mixes with it and is carried through canal 42, gooseneck 40 and nozzle 32. The purpose of the gooseneck 40 is to orient the flow of materials so that the stream of adhesive, sand, cotton linters, etc., may be easily directed against an automobile tire while the pressure vessel is held in a vertical position, as shown. The nozzle may or may not have a flared portion 33 to aid in the distribution of traction aiding materials over the tire surface.

To assist in the fabrication and assembly of the pressure vessel of Fig. 1, the tubular stem may be fabricated in two pieces 32 and 37 which are fastened together by means of joint 48. Again to assist in making the pressure seal at the neck, as well as helping prevent the tubular stem 32 from being pushed up too far by spring 21, tubular stem 32 is provided with a flared portion 49 as shown. Of course the valve seat actually prevents stem 32 from being pushed up beyond limits.

In Fig. 1, 27 is the neck of the container which is preformed in shell portion 11 of the container and through which stem 37 passes. 28 is an O ring which is tightly seated by the internal pressure against the inner walls of 27 and the outer walls of 37. 29 is a stem which attaches finger piece 30 to stem 37 in the vicinity of gooseneck 40. Actually, 29 and 30 are unnecessary, although convenient, parts. The device may of course be operated by simply pushing down on stem 37.

The bottom portion of shell 10 has a mildly concave portion 16 to provide added strength against internal pressure. A more sharply concave portion 17 is centrally provided to form a nipple for seating spring 21. Valve stem 23 is fastened to canal piece 26 and the valve extension 20 by means of eyeleted portions 25 and 24, respectively.

Figure 8:
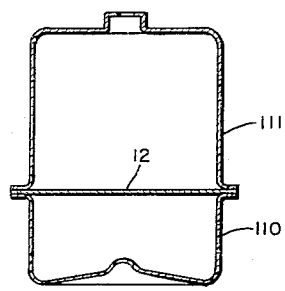
Figure 8 is a vertical cross-section showing an alternative method of fabricating the pressure vessel container.

If necessary, more economical or convenient, the container formed of shells 10 and 11, and associated parts, may be fabricated in a variety of ways such, for example, as illustrated in Fig. 8, without departing from the teachings of the present invention. The means shown in Fig. 1 is but one of many which might be used to separately contain under pressure an adhesive mixture and a mixture of traction aiding materials, and at the same time provide means for mixing all together at the moment of application, and then finally ejecting the mixture at high velocity against the outer tread surface of an automobile tire. Moreover, it is not absolutely essential that the adhesive mixture and the mixture of traction aiding materials be kept separated in the pressure vessel. A single cavity type of container might likewise be provided to contain the entire mixture. This type of container would of course require considerable shaking and mixing just prior to use.

In Fig. 8, the lower shell of the container is 110, the upper shell is 111, and the diaphragm is again 12. Other parts of a complete assembly would be the same as shown in Fig. 1.

The gasket 22 is preferably made of a material such as Teflon or polyethylene which will not react with or firmly adhere to the adhesive that is used.

The preferred method of applying the traction aiding materials of the pressure vessel of Fig. 1 is to jack-up or otherwise elevate the wheels of the vehicle, slowly rotate them and spray the materials of the pressure vessel criss-cross circumferentially, or combinations of criss-cross and circumferentially against the tire tread.

The adhesives available on the market today are exceptionally strong and capable of withstanding forces of many hundreds of pounds per square inch, particularly when squeezed between tire and road with each revolution of the wheel. Moreover, the moment when adhering strength is required from any group of particles is the moment when they are being squeezed against the road.

Reference numerals in Figures 2, 3, 4, and 5 refer to the same parts and features just described in connection with Fig. 1.

Figure 6 shows an alternative type of aerosol pressure vessel and traction aiding materials assembly. The container 50 is filled with a mixture of adhesives and pressure producing materials such as Freon. When stem 51 is depressed by means of button 69, a valve of the type shown in Fig. 1, or similar, is opened and the adhesive mixture is forced up stem 51 and out nozzle 68. A spool of string or filamentary material 59 is provided in the assembly and the portion 58 of the string is passed into stem 51, by means of a closely fitting eyelet 57, and out nozzle 68. At the moment of application to a tire, the end 59 of portion 58 is fastened to the tire by means of a squirt of adhesive 71, a wad of gum, or other suitable material. Then, as tire 60 is rotated, button 69 is depressed and string and adhesive fed onto the tire tread surface, preferably in a criss-cross pattern 61, as shown, but any desirable pattern may be used as already noted. This procedure is continued until the tire tread surface is adequately covered. If desirable, the filamentary material may be extended beyond the tread surface of the tire and on to the tire walls to produce areas of fastening which are not subject to road wear.

To further aid in holding the traction aiding material to the tire, portions of it are frequently poked or forced down into the serrations of the tire tread using a nail or other suitable tool.

Continuing with the description of Fig. 6, 52 is the shell of container 50; 53 is the bracket for supporting the string assembly from the container 50. This bracket is placed over neck 55, of the container, which has a rolled-in groove into which locking ring 54 fits thus holding 53 against the top of the container, as shown. 56 is the O ring which seals stem 51 against internal pressure as heretofore described in connection with Fig. 1. Bracket 53 has a shaft 64 welded or otherwise fastened to it. The string is spooled on a cardboard tube 63, in the usual way, and placed on shaft 64. The end of shaft 64 has threads 65, and the spool 59 is held in place by means of washer 66 and nut 67. Bracket 53 is provided with a slot 62 through which the string or filamentary material passes on the way to eyelet 57. 70 is a stem by means of which button 69 is attached to 51.

To further assist in providing good traction on slippery roads, the filamentary material of spool 59 may be impregnated with sand particles, be provided with metallic fibers, etc. Again, the container 50 may, in addition to the mixture of adhesive and Freon, contain sand and other abrasive particles which are discharged onto the tire along with string and adhesive.

Again, the traction aiding material, while contained in the pressure vessel, may be in liquid form and upon ejection from a nozzle into the air and against the tire surface assume a sheet-like, fibrous or other solid form. For example, collodion mixed with adhesive serves this purpose very well. Any water-wetting material, substance or combination which will adhere to an automobile tire for a reasonable length of time can be used as a traction aid on wet roads. Likewise, any rough or abrasive material, substance or combination which adheres to an automobile tire will serve as a traction aid on icy or snow-covered roads. Many forms and combinations of materials, methods and means of this invention may occur to those skilled in the art once it is realized in accordance with the teachings of this invention, that the tractive bond made by commercially available adhesives to an automobile tire is sufficiently strong to hold many kinds of traction-aiding materials in place against a road surface—even in the presence of considerable wear.

While extremely convenient, the traction-aiding materials and adhesive need not necessarily be packaged and mixed together at or prior to the time of application. These materials may be packaged separately and the adhesive first applied to the tire, followed by the traction aiding materials. Accordingly, the invention shall finally be construed only in terms of the appended claims.

What is claimed is:

1. An assembly for containing and mixing traction aiding materials and adhesives and of discharging the mixture upon the surface of a vehicle tire, comprising means for containing adhesive mixtures under pressure, separated means for holding traction aiding materials and means for simultaneously combining said adhesive mixtures and said traction aiding materials and discharging said combined mixtures upon the outer surface of said vehicle tire comprising a vessel adapted to receive said adhesive mixtures and said traction aiding materials, and a nozzle fastened to said vessel adapted to discharge said mixtures and materials upon the surface of said vehicle tire.

2. An assembly for containing and mixing traction aiding materials and adhesives and of discharging the mixture upon the surface of a vehicle tire, as in claim 1, said means for containing adhesive mixtures under pressure comprising one cavity of a dual cavity container, said means for holding traction aiding materials comprising the second cavity of said dual cavity container, said means for simultaneously combining said adhesive mixtures and said traction aiding materials and discharging said combined mixtures upon the outer surface of said tire comprising a vessel which connects with said first cavity by means of a normally closed valve and a set of ports and which is provided with open means in the vicinity of said ports for connecting with said second cavity, a tube which is connected to said vessel and a nozzle which is connected with said tube, said valve provided with means for opening it and adapted to discharge said adhesive mixtures into said vessel through said ports, and the latter, in conjunction with said open means, adapted to drive said traction aiding mixtures into the same said vessel and produce therein a mixture of adhesives and traction aiding materials, said nozzle adapted to discharge said combined mixtures upon said tire surface.

3. An assembly for containing and mixing traction aiding materials and adhesives and of discharging the mixture upon the surface of a vehicle tire, as in claim 1, said means for containing adhesive mixtures under pressure comprising a pressure container, said means for holding traction aiding materials comprising a bracket and a shaft, said bracket fastened to and supported from said pressure container, said shaft fastened to and supported from said bracket and disposed to hold a spool of filamentary traction aiding materials, said pressure container being fitted with a tubular stem, a nozzle and a normally closed valve, said tubular stem being partly within and partly without said pressure container, said part of stem without said pressure container being fitted with said nozzle and an eyelet, said eyelet disposed to permit entry and passage of said filamentary material into said tubular stem, said nozzle being disposed to permit egress of said filamentary material and said adhesive material, said valve provided with operating means adapted to discharge said adhesive mixtures into said tubular stem.

4. An assembly for producing and attaching traction aiding devices, of an expendable variety, to automobile tires and the like, comprising a multiple cavity container, a mixture of traction aiding materials, an aerosol of adhesives and pressure producing ingredients, a normally closed valve, a means of operating said valve, and a nozzle, said traction aiding materials being stored in one of said cavities of said container, said aerosol being generally confined to a second of said cavities, a third cavity which has a free opening which connects with said first cavity and which communicates through a set of ports and said normally-closed valve with said second cavity, said third cavity disposed for mixing said traction aiding materials and said aerosol, said nozzle connected to said third cavity by means of a tubular piece which passes outside said multiple cavity container, said means for operating said normally closed, valve comprising a stem fastened to said tubular piece and to a piston, a valve seat having an opening joining said second and third cavities, a gasket fastened to said piston and a spring adapted to hold said piston and gasket over said opening of said valve seat so as to block passage of said aerosol from said second to said third cavities, said ports disposed between said valve and said third cavity in the vicinity of said free opening between said first and third cavities.

5. An assembly for producing and attaching traction aiding devices of an expendable variety to automobile tires, and the like, comprising a closed cylindrical container which generally consists of upper and lower cup-like portions adjoining each other in brim-to-brim relationship and separated by a disc-like portion, said upper cup-like portion being inverted with respect to said lower cup-like portion, each cup-like portion being generally fabricated from one piece of metal and having bottoms, shells and brims which are generally continuous and which together with said disc-like portion provide separated upper and lower chambers, respectively, said disc-like portion and said two brims coming together to form a pressure tight joint, said upper cup-like portion having a neck through which a tubular stem passes, said tubular stem having portions internal and external with respect to said cylinder container and provided with a gasket seal for internal pressure, said gasket seal fitting tightly around said stem and pressing tightly against the internal surface of said neck which has a flared edge preventing the escape of said gasket, the internal portion of said tubular stem opening into a cylindrical chamber the walls of which are a continuation of said tubular stem, said tubular stem and cylindrical chamber being fastened together by means of a joint, said tubular chamber extending internally to the vicinity of said disc-like portion and opening into said upper chamber, said disc-like portion being provided with ports in the region where said tubular chamber opens into said upper chamber, said disc-like portion having a centrally located cylindrical piece fastened to it which extends into said lower chamber to a region near the bottom of said lower cup-like portion, said cylindrical piece having a cylindrical valve seat attached to its inner wall and extending a short distance into said lower chamber just below said ports, said tubular chamber being provided with a centrally-located valve stem which is attached to one wall thereof and which passes through an opening in said disc-like portion and extends into said lower chamber and is there attached to a cylinder of approximately the same diameter as said valve seat, said cylinder being provided with a valve gasket on the surface adjacent said valve seat, said cylinder and said valve seat being in alignment, said cylinder being provided with a spring which pushes against the bottom of said lower cup-like portion and against said cylinder to hold said valve gasket against said valve seat, said tubular stem, said tubular chamber, said valve stem, said valve cylinder and said valve gasket forming an assembly having freedom of motion along an axis generally coincident with the axes of said cylindrical container, said freedom of motion being opposed by said spring and stopped by said valve gasket and said valve seat, said lower chamber being generally filled with a mixture of adhesives and pressure producing materials, said upper chamber being generally filled with pulverized traction aiding materials.

References Cited in the file of this patent
UNITED STATES PATENTS

| | | |
|---|---|---|
| 137,472 | Nobles | Apr. 1, 1873 |
| 1,290,576 | Kendall | Jan. 7, 1919 |
| 1,824,815 | Fuchs | Sept. 29, 1931 |
| 2,585,219 | Boyle | Feb. 12, 1952 |